US009778769B2

(12) United States Patent
Yang et al.

(10) Patent No.: US 9,778,769 B2
(45) Date of Patent: Oct. 3, 2017

(54) METHODS FOR DRIVING A TOUCH SCREEN

(71) Applicant: Shanghai Tianma Micro-Electronics Co., Ltd., Shanghai (CN)

(72) Inventors: Kang Yang, Shanghai (CN); Jun Ma, Shanghai (CN); Tianyi Wu, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 22 days.

(21) Appl. No.: 14/064,058

(22) Filed: Oct. 25, 2013

(65) Prior Publication Data
US 2014/0049512 A1 Feb. 20, 2014

Related U.S. Application Data

(63) Continuation of application No. PCT/CN2012/084267, filed on Nov. 8, 2012.

(30) Foreign Application Priority Data

Jun. 28, 2012 (CN) .......................... 2012 1 0219702

(51) Int. Cl.
G06F 3/041 (2006.01)
G09G 3/36 (2006.01)
(52) U.S. Cl.
CPC .......... G06F 3/0412 (2013.01); G06F 3/0416 (2013.01); G09G 3/3674 (2013.01)
(58) Field of Classification Search
CPC .... G06F 3/0412; G06F 3/0416; G09G 3/3674
(Continued)

(56) References Cited

U.S. PATENT DOCUMENTS

2004/0227743 A1* 11/2004 Brown ................ G02F 1/13338
345/204
2011/0181544 A1 7/2011 Lee
(Continued)

FOREIGN PATENT DOCUMENTS

CN 1971695 A 5/2007
CN 101562048 A 10/2009
(Continued)

OTHER PUBLICATIONS

Search Report as issued in corresponding European Application 12856593.0, dated Jan. 28, 2015.

Primary Examiner — Chanh Nguyen
Assistant Examiner — Daniel Duong
(74) Attorney, Agent, or Firm — Alston & Bird LLP

(57) ABSTRACT

A driving method for a touch screen is disclosed. The touch screen includes a display panel, a touch panel, and a control circuit. Each of a plurality of display cycles includes at least two first time sequences and at least two second time sequences. The method includes, during each of the first time sequences, generating a plurality of scanning control signals for a display scanning line driving circuit, and, in response to the scanning control signals, delivering a plurality of scanning signals to different display scanning lines. The method also includes, during each of the second time sequences, generating a plurality of scanning control signals for the touch scanning line driving circuit, and, in response to the scanning control signals for the touch scanning line driving circuit, sequentially delivering scanning signals to all of the touch scanning lines of the touch panel.

12 Claims, 8 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2011/0267295 A1* | 11/2011 | Noguchi et al. | 345/173 |
| 2012/0044166 A1 | 2/2012 | Mizuhashi et al. | |
| 2012/0056835 A1* | 3/2012 | Choo et al. | 345/173 |
| 2012/0154322 A1 | 6/2012 | Yang et al. | |
| 2012/0194489 A1* | 8/2012 | Iwamoto et al. | 345/204 |
| 2013/0076607 A1* | 3/2013 | Matsuda et al. | 345/87 |
| 2013/0335374 A1* | 12/2013 | Sugita et al. | 345/174 |

FOREIGN PATENT DOCUMENTS

| | | |
|---|---|---|
| CN | 101978504 A | 2/2011 |
| CN | 102222475 A | 10/2011 |
| CN | 102375639 A | 3/2012 |
| CN | 102402330 A | 4/2012 |
| EP | 2469380 A2 | 6/2012 |
| KR | 20110100295 A | 9/2011 |
| KR | 20120025923 A | 3/2012 |
| WO | WO-2012117928 * | 9/2012 |

* cited by examiner

--Prior Art--

--Prior Art--

--Prior Art--

METHODS FOR DRIVING A TOUCH SCREEN

CROSS-REFERENCES TO RELATED APPLICATIONS

This application claims priority to and is a continuation of International Patent Application PCT/CN2012/084267, titled "DRIVING METHOD FOR TOUCH SCREEN", filed on Nov. 8, 2012, which claims priority to Chinese patent application No. 201210219702.X titled "DRIVING METHOD FOR TOUCH SCREEN" and filed on Jun. 28, 2012 with the State Intellectual Property Office of People's Republic of China, the contents of which are incorporated herein by reference in their entirety.

TECHNICAL FIELD

The present invention relates to a driving method for a display screen, and in particular to a driving method for a touch screen.

BACKGROUND OF THE INVENTION

With the progressive development of sciences and technologies, a touch panel is generally integrated on a liquid crystal display screen to form a touch screen, in order for more convenient and effective operations and control. Generally, a touch screen is mainly formed by a display panel, a touch panel and a control circuit.

The display panel widely used at present is a Thin Film Transistor Liquid Crystal Display (TFT-LCD) panel. FIG. 1 is a schematic diagram showing the conventional structure of a display panel. As shown in FIG. 1, the display panel 10 includes a plurality of pixel units arranged in an array. If the display panel 10 is intended for color display, each of the pixel units may include a plurality of sub-pixel units which display different colors, respectively, e.g., three sub-pixel units 11 which respectively display in red, green, and blue (RGB). A Thin Film Transistor (TFT) is used as a driving switch for each pixel unit. Generally, in the display panel 10, the display of each sub-pixel unit 11 is achieved by a display scanning line 13 in the horizontal direction and a data line 12 in the vertical direction. The control circuit includes a gate driving circuit 31 and a source driving circuit 32, where the gate driving circuit 31 generates pulse driving signals respectively for the display scanning lines 13 of the display panel 10 based on a time sequence in order to activate the sub-pixel units 11 corresponding to display scanning line 13 of the above-mentioned line, and then the activated sub-pixel units 11 receive data signals delivered from the source driving circuits 32 through the data lines 12, to display the corresponding gray scales according to the data signals having different voltages.

FIG. 2 is a schematic diagram showing the conventional structure of a touch panel. In combination of FIGS. 1 and 2, a touch panel 20, which is overlapped with the display panel 10, includes a plurality of sensing units 21 arranged in an array. The sensing of each of the sensing units 21 is achieved through a touch scanning line 23 in the horizontal direction and a sensing line 22 in the vertical direction in the display panel 20. The control circuit further includes a touch driving circuit 33 and a sensing driving circuit 34, where the touch driving circuit 33 generates pulse driving signals respectively for the touch scanning lines 23 of the display panel 20 based on a time sequence, and the sensing driving circuit 34 sequentially detects the sensing units 21 connected with the touch scanning line 23 of the above-mentioned line, to determine whether a touch occurs or not, and further to determine the specific location of the touch.

In order for an accurate display effect, the display panel 10 is typically provided with hundreds to thousands of the display scanning lines 13, e.g., 480, 576, or 1024 display scanning lines; while the touch panel 20 is typically provided with more than tens to hundreds of touch scanning lines 23, e.g., 100 touch scanning lines. Therefore, during the scanning process, the scanning time of the display panel 10 is generally greater than that of the touch panel 20.

During the actual touch display process, the control circuit outputs several periodic control signals to enable the scanning of the display panel and the touch panel. FIG. 3 is a schematic diagram showing a conventional time sequence allocation in a driving method of a touch screen. As shown in FIG. 3, the frequency (i.e. frame frequency) of the periodic scanning signal is 60 Hz for example, which means that the time duration of each cycle C0 is 16.67 ms, two time sequences, namely a first time sequence C1 and a second time sequence C2, are included in the cycle C0, and preferable time allocation of the cycle C0 is that the time duration of the time sequence C1 is 14.67 ms and the time duration of the time sequence C2 is 2 ms. Within one cycle C0, the control circuit generates and sequentially delivers a plurality of scanning signals to all of the display scanning lines of the display panel during the first time sequence C1 in order to complete one scanning process of the display panel, and then generates and sequentially delivers a plurality of scanning signals to the touch scanning lines of the touch panel during the second time sequence C2 in order to complete one scanning process of the touch panel, and thereafter, the scanning result of the touch panel is processed and analyzed, so as to control the display of the display panel in the next cycle. Therefore, in the conventional scanning mode, the scanning frequency of the touch screen is consistent with that of the display screen.

However, since it is increasingly demanding for the touch sensitivity of the touch panel, the scanning frequency of the touch screen needs to be effectively increased to be above 100 Hz, even above 120 Hz in order to achieve a good touch response speed. However, the scanning frequency of the display panel cannot be increased with that of the touch screen, because the scanning time for each display scanning line of the display panel will be significantly reduced if the scanning frequency of the display panel is excessively high, so that the charge time and discharge time for each sub-pixel unit in the display panel are significantly reduced, which easily causes insufficient charge time and discharge time, thereby degrading the display effect of the display panel. Therefore, it is difficult for the conventional scanning mode to both effectively improve the sensitivity of the touch screen and keep the display effect of the panel display.

BRIEF SUMMARY OF THE INVENTION

One aspect includes a driving method for a touch screen. The touch screen includes a display panel, a touch panel, and a control circuit. Each of a plurality of display cycles includes at least two first time sequences and at least two second time sequences. The method includes, during each of the first time sequences, generating a plurality of scanning control signals for a display scanning line driving circuit, and, in response to the scanning control signals, delivering a plurality of scanning signals to different display scanning lines. The method also includes, during each of the second time sequences, generating a plurality of scanning control signals for the touch scanning line driving circuit, and, in response to the scanning control signals for the touch scanning line driving circuit, sequentially delivering scanning signals to all of the touch scanning lines of the touch panel.

DETAILED DESCRIPTION OF THE INVENTION

Figure 1:
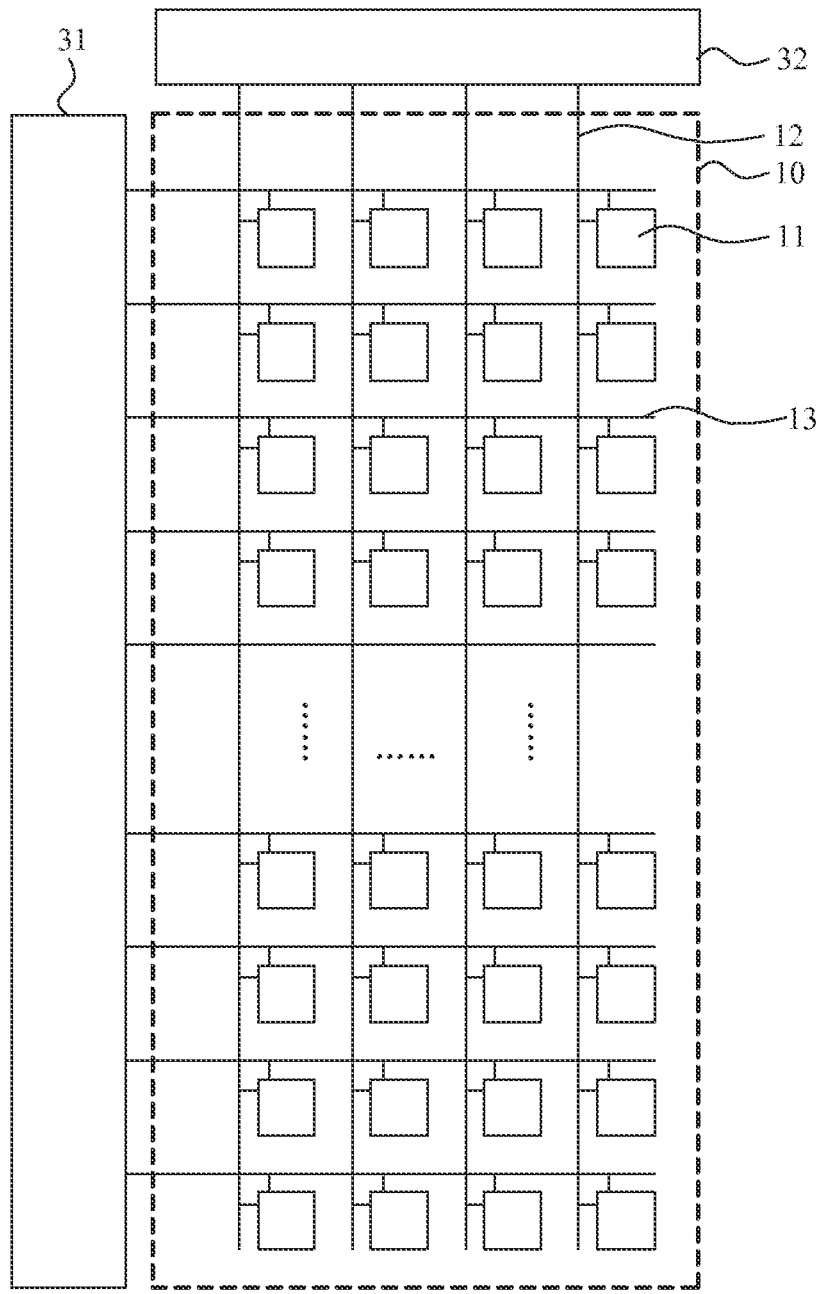
FIG. 1 is a schematic diagram showing the conventional structure of a display panel.
Figure 2:
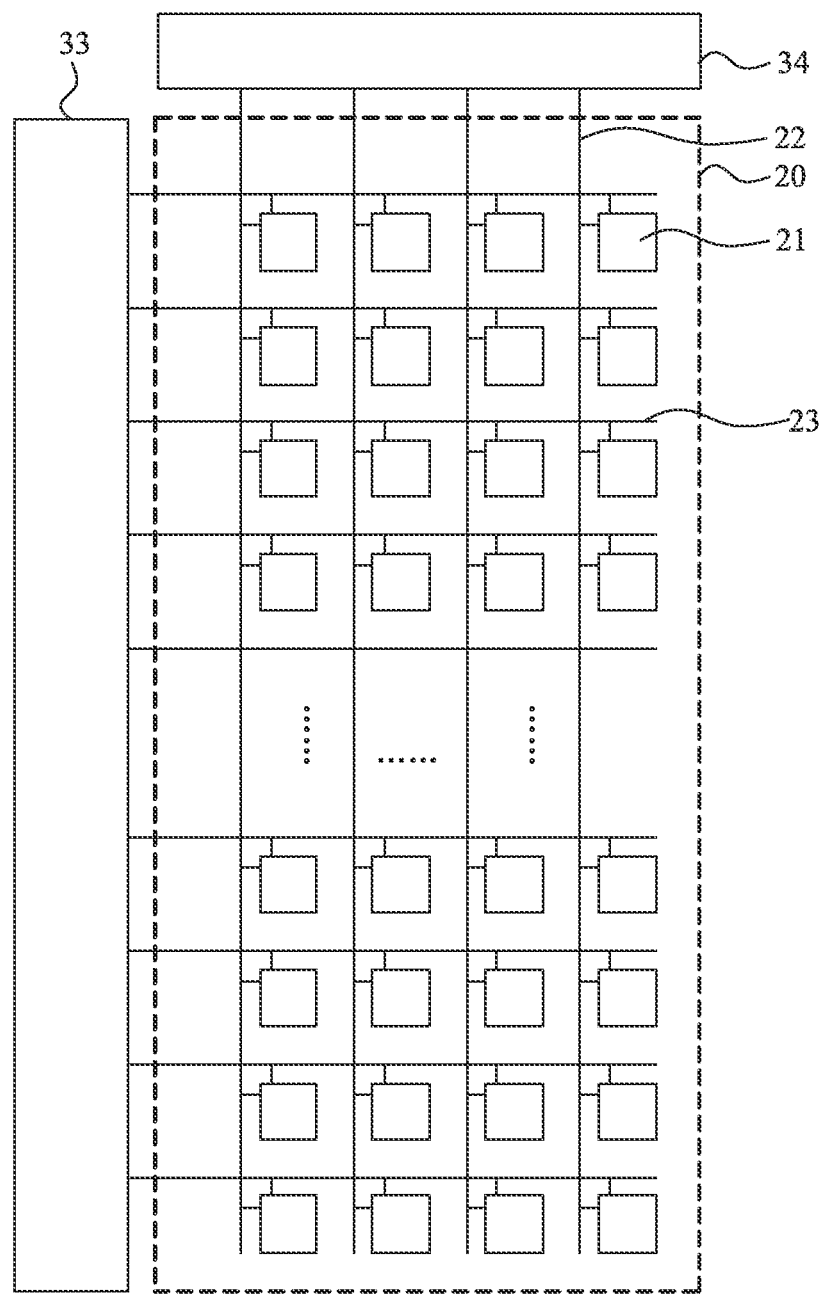
FIG. 2 is a schematic diagram showing the conventional structure of a touch panel.
Figure 3:
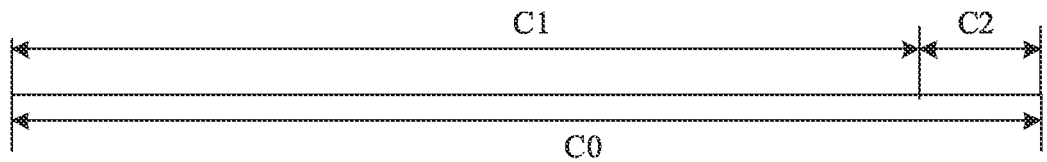
FIG. 3 is a schematic diagram showing the conventional time sequence allocation in a driving method for a touch screen.

For better understanding of the disclosure of the present invention, the disclosure will be further described below with reference to the accompanying drawings. The invention is not limited to the specific embodiments disclosed, and general substitutions known by those skilled in the art also fall within the scope of the present invention.

Next, the present invention is described in detail with schematic diagrams. In the detailed description of the embodiments of the present invention, the schematic diagrams are generally locally enlarged without conforming to the general scale for the sake of the description, but it should not be considered as a limitation on the invention.

The disclosed embodiments provide a driving method for a touch screen, where the touch screen includes a display panel, a touch panel and a control circuit. The control circuit outputs several periodic scanning control signals, each cycle of which includes at least two first time sequences and at least two second time sequences, and the at least two first time sequences are arranged alternately in sequence with the at least two second time sequences. In each of the first time sequences, the control circuit generates and delivers a plurality of scanning control signals to a display scanning line driving circuit of the display panel, in order to control the display scanning line driving circuit to deliver, in different first time sequences within each cycle, the scanning signals to different display scanning lines of the display panel, and the delivery of the scanning signals to all of the display scanning lines of the display panel is completed by the display scanning line driving circuit in all of the first time sequences within each cycle; in each of the second time sequences, the control circuit generates a plurality of scanning control signals for the touch scanning line driving circuit of the touch panel, which sequentially delivers the scanning signals to all of the touch scanning lines of the touch panel, and the touch scanning lines of the touch panel enable the scanning of the touch panel, to determine whether a touch occurs or not and further determine the location of the touch.

The display scanning line driving circuit is configured to provide the display scanning signals to the display scanning lines of the display panel, and the touch scanning line driving circuit is configured to provide the touch scanning signals to the touch scanning lines of the touch panel. In each of the first time sequences, the display scanning line driving circuit of the display panel sequentially generates a plurality of scanning signals and correspondingly delivers the same to the display scanning lines of the display panel to perform the scanning, where each of the scanning signals corresponds to one display scanning line. In each of the second time sequences, the touch scanning line driving circuit sequentially generates a plurality of scanning signals and correspondingly delivers the same to the touch scanning lines of the touch panel to perform the scanning, where each of the scanning signals corresponds to one touch scanning line.

In the driving method for the touch screen according to the present invention, at least two first time sequences and at least two second time sequences are included within one cycle, where the control circuit generates a plurality of scanning control signals in different first time sequences, to control the display scanning line driving circuit to perform the scanning for different display scanning lines of the display panel, and the scanning for all of the display scanning lines of the display panel is completed in all of the first time sequences of one cycle; and a plurality of scanning signals are generated and sequentially delivered to all of the touch scanning lines of the touch panel in each of the second time sequences, so that the display scanning of the display panel is completed once and the touch scanning of the touch panel is completed twice within one cycle. Therefore, with the driving method for the touch screen according to the present invention, the frequency of the touch scanning can be greatly increased without increasing the frequency of the display scanning, so that not only sufficient scanning time is ensured for the display panel to enable the clear display, but also the frequency of the touch scanning is increased, and the noise interference is reduced, thereby improving the detection accuracy and the response speed of the touch panel.

Figure 4:
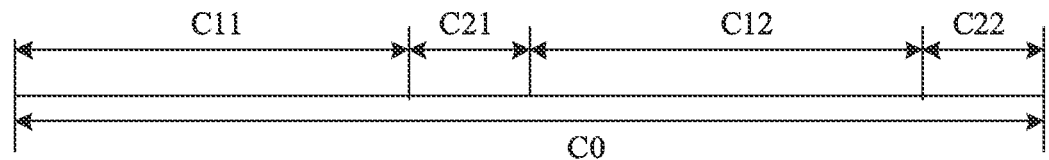
FIG. 4 is a schematic diagram showing time sequence allocation of a driving method for a touch screen according to an embodiment of the present invention.

FIG. 4 is a schematic diagram showing time sequence allocation of a driving method for a touch screen according to an embodiment of the present invention. In the present embodiment, as shown in FIG. 4, each cycle C0 includes two first time sequences C11 and C12 and two second time sequences C21 and C22, where the first time sequences C11 and C12 are arranged alternately in sequence with the second time sequences C21 and C22. In the first one of the first time sequences C11, the control circuit generates and delivers a plurality of scanning control signals to a display scanning line driving circuit of the display panel, in order to control the display scanning line driving circuit to generate and sequentially deliver a plurality of scanning signals to a part of the display scanning lines of the display panel; and then, in the first one of the second time sequence C12, the control circuit generates a plurality of scanning control signals for a touch scanning line driving circuit of the touch panel, in order to control the touch scanning line driving circuit to generate and sequentially deliver a plurality of scanning signals to all of the touch scanning lines of the touch panel; next, in the second one of the first time sequence C21, the control circuit generates and delivers a plurality of scanning control signals to the display scanning line driving circuit of the display panel, in order to control the display scanning line driving circuit to generate and sequentially deliver a plurality of scanning signals to the remaining display scanning lines of the display panel, so that the control circuit controls the display scanning line driving circuit to complete the delivery of the scanning signals to all of the display scanning lines of the display panel within the time duration of both the first and second time sequences C11 and C12; finally, in the second one of the second time sequence C22, the control circuit generates again a plurality of scanning control signal for the touch scanning line driving circuit of the touch panel, in order to control the touch scanning line driving circuit to generate and sequentially deliver a plurality of scanning signals to all of the touch scanning lines of the touch panel.

Thus in different first time sequences within each cycle, the control circuit delivers the scanning control signals to the display scanning line driving circuit of the display panel in order to control the display scanning line driving circuit to deliver scanning signals to different display scanning lines; and in all of the first time sequences within each cycle, the control circuit delivers the scanning control signals to the display scanning line driving circuit of the display panel in order to control the display scanning line driving circuit to complete the delivery of the scanning signals to all of the display scanning lines of the display panel, in this case, the selection of the display scanning lines for scanning in each of the first time sequences may be performed in several manners. Next, examples, in which each cycle includes two first time sequences and the display scanning lines include display scanning lines of a first type and display scanning lines of a second type, are used below to illustrate the scanning modes. However, it should be noted that the present invention is not limited to the following scanning modes, and other modes, e.g. a mode in which the time duration of one of the two first time sequences is different from that of another one of the two first time sequences, and a mode in which the ratio of time allocated to the two first sequences is identical with the ratio of the numbers of corresponding display scanning lines in each of the two first time sequences, the manner for scanning the display panel in multiple first time sequences also falls within the scope of the concept of the present invention.

In an embodiment, the control circuit generates and delivers a plurality of scanning control signals to the display scanning line driving circuit of the display panel, in order to control the display scanning line driving circuit to respectively scan odd display scanning lines and even display scanning lines in the two first time sequences, respectively, where the odd display scanning lines are arranged alternately with the even display scanning lines. Specifically, the display scanning lines of the first type consist of all of the odd display scanning lines, i.e., the first display scanning line, the third display scanning line, the fifth display scanning line, etc., and the display scanning lines of the second type consist of all of the even display scanning lines, i.e., the second display scanning line, the fourth display scanning line, the sixth display scanning line, etc. In the first one of the first time sequences, the control circuit generates and sequentially delivers a plurality of scanning control signals to the display scanning line driving circuit of the display panel in order to control the display scanning line driving circuit to generate and sequentially deliver a plurality of scanning signals to the display scanning lines of the first type of the display panel, and in the second one of the first time sequences, the control circuit generates and sequentially delivers a plurality of scanning control signals to the display scanning line driving circuit of the display panel in order to control the display scanning line driving circuit to generate and sequentially deliver a plurality of scanning signals to the display scanning lines of the second type of the display panel, so that all of the display scanning lines of the display panel are scanned once in all of the first time sequences within one cycle.

In another embodiment, the control circuit controls the display scanning line driving circuit in the two first time sequences to scan the former part of the display scanning lines and the latter part of the display scanning lines, respectively. That is, if the number of display scanning lines is defined as K, then the display scanning lines of the first type consist of the first to Lth display scanning lines and the display scanning lines of the second type consist of the (L+1)th to Kth display scanning lines, where K is a positive integer, and L is a positive integer less than K. The display scanning line driving circuit scans the display scanning lines of the first type in the first one of the first time sequences, and scans the display scanning lines of the second type in the second one of the first time sequences. In a preferred embodiment, the number of the display scanning lines of the first type is the same with that of the display scanning lines of the second type, and the time duration of the first one of the first time sequences is equal to that of the second one of the first time sequences, thereby facilitating the overall circuit design and time sequence control of the touch screen. That is, if the number of display scanning lines is defined as 2n, where n is a positive integer, then the display scanning lines of the first type consist of the 1st to nth display scanning lines, and the display scanning lines of the second type consist of the (n+1)th to 2nth display scanning lines, that is, in the first one of the first time sequences, the control circuit delivers the scanning signals to the 1st to nth display scanning lines, in the second one of the first time sequences, the control circuit delivers the scanning signals to the (n+1)th to 2nth display scanning lines. For instance, if 480 display scanning lines are present, then the display scanning lines of the first type include the 1st to 240th display scanning lines, and the display scanning lines of the second type includes the 241th to 480th display scanning lines.

In the preferred embodiment, in each cycle, the time durations of different second time sequences are the same with each other, and the time durations of the different first time sequences are the same with each other. Each cycle includes two first time sequences and two second time sequences, and the control circuit outputs the periodic scanning signals having a frequency in a range from 50 Hz to 70 Hz (e.g. 60 Hz). With such a frequency range, the cycle is sufficient for the control circuit to generate and deliver a plurality of scanning control signals to the display scanning line driving circuit of the display panel in order to control the display scanning line driving circuit to generate and sequentially deliver a plurality of scanning signals to the display scanning lines of the display panel, and each scanning signal is sufficient for the pixel units in the corresponding display scanning line to complete charging and discharging, thereby achieving clear display of the display panel. Each cycle includes two second time sequences, each of which may have a time range from 1 ms to 2 ms (e.g. 2 ms), that is, the touch panel is completely scanned twice within each cycle, in this case, the actual scanning frequency of the touch panel is 120 Hz, thus greatly improving the scanning frequency of the touch panel and reducing the noise interference, further increasing the response speed and the detection accuracy of the touch panel. Of course, each cycle is not limited to contain two first time sequences and two second time sequences, and such a manner that three first time sequences and three second time sequences are included within each cycle (that is, the touch panel is completely scanned for three times in each cycle) so that the actual scanning frequency of the touch panel is raised to 180 Hz is also within the scope of the concept of the present invention.

In the present embodiment, the display scanning line driving circuit includes at least one Amorphous Silicon Gate driving circuit (ASG circuit), each of which includes several amorphous silicon shift register circuits respectively corresponds to the display scanning lines, and the output terminal of each of the amorphous silicon shift register circuits is electrically connected with the corresponding display scanning line. The manner of the circuit connections of the amorphous silicon gate driving circuit may depend on process requirements, in order to design scanning signals with different time sequences based on the actual process requirements. The structure of the display scanning line driving circuit and the operational time sequences thereof will be illustrated below with reference to several embodiments, to further specifically describe the operation process of the touch screen in the present invention. Of course, the structure of the display scanning line driving circuit is not limited to the following embodiments.

A First Embodiment

Figure 5:
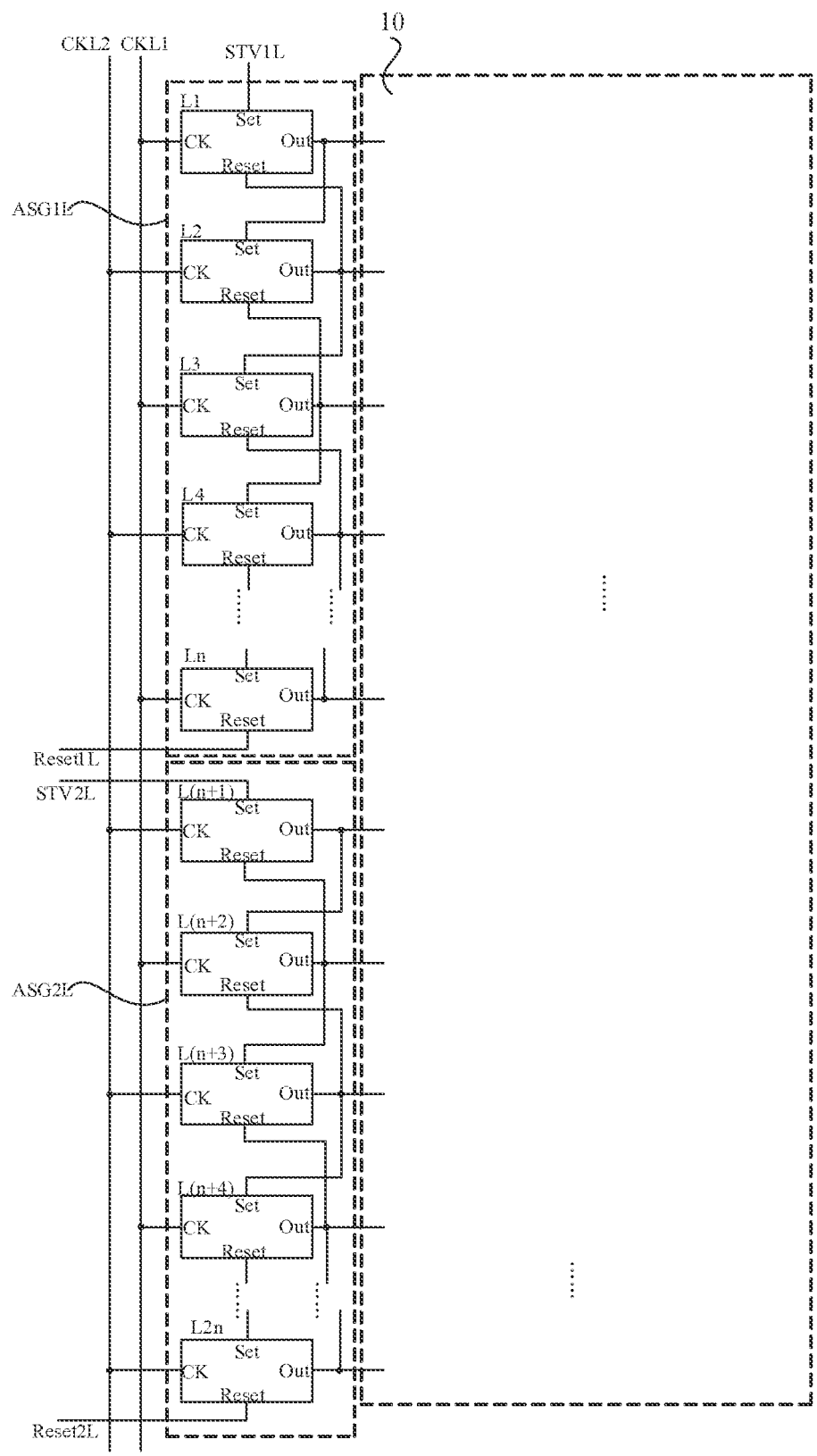
FIG. 5 is a schematic diagram showing the structure of a display scanning line driving circuit according to an embodiment of the present invention.
Figure 6:
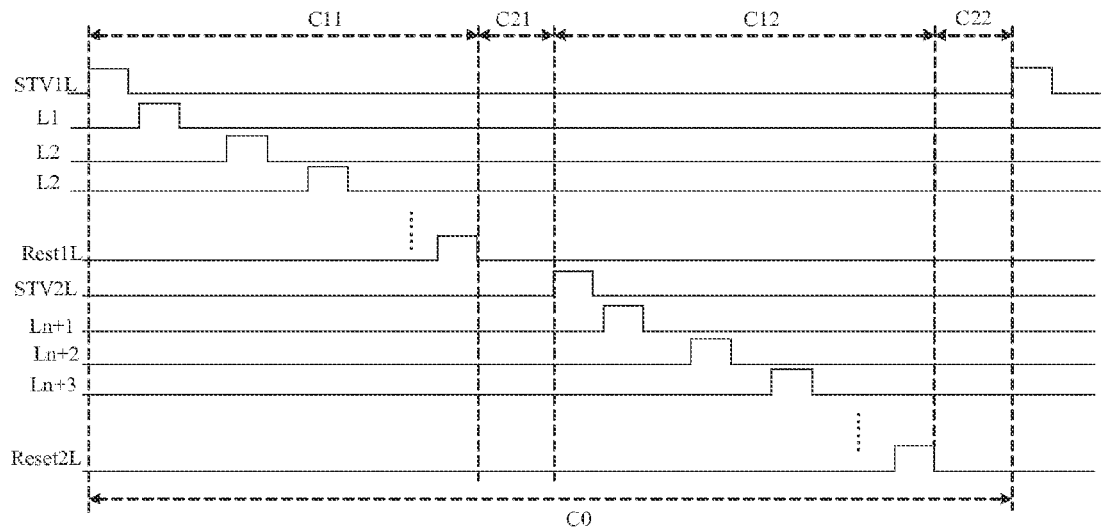
FIG. 6 is a diagram showing operating time sequences of the display scanning line driving circuit according to an embodiment of the present invention.

FIG. 5 is a schematic diagram showing the structure of the display scanning line driving circuit according to an embodiment of the present invention. FIG. 6 is a diagram showing time sequences of the display scanning line driving circuit according to an embodiment of the present invention. In the present embodiment, a first amorphous silicon gate driving circuit ASG1L and a second amorphous silicon gate driving circuit ASG2L are disposed on a side of the display panel 10. As shown in FIG. 5, in the present embodiment, the first amorphous silicon gate driving circuit ASG1L and the second amorphous silicon gate driving circuit ASG2L are disposed together on the left side of the display panel 10, or alternatively on the right side of the display panel 10.

The first amorphous silicon gate driving circuit ASG1L scans the former part of the display scanning lines (i.e., the display scanning lines of the first type) in the first one of the first time sequences, and the second amorphous silicon gate driving circuit ASG2L scans the latter part of the display scanning lines (i.e., the display scanning lines of the second type) in the second one of the first time sequences, in this case, the ratio of the time duration of the first one of the first time sequences to the time duration of the second one of the first time sequences corresponds to the ratio of the number of the display scanning lines of the first type to the number of the display scanning lines of the second type. Specifically, the number of the display scanning lines is defined as K, where the first amorphous silicon gate driving circuit ASG1L is formed by L sequentially arranged amorphous silicon shift registers which respectively correspond to the 1st to Lth display scanning lines, and the second amorphous silicon gate driving circuit ASG2L is formed by (K−L) sequentially arranged amorphous silicon shift registers which respectively correspond to the (L+1)th to Kth display scanning lines, where K is a positive integer, and L is a positive integer less than K.

In the preferred embodiment, the number of display scanning lines is defined as 2n, where n is a positive integer, and the number of the display scanning lines of the first type is the same with that of the display scanning lines of the second type. The first amorphous silicon gate driving circuit is formed by n sequentially arranged amorphous silicon shift registers which respectively correspond to the 1st to nth display scanning lines, and the second amorphous silicon gate driving circuit are formed by n sequentially arranged amorphous silicon shift registers which respectively correspond to the (n+1)th to 2nth display scanning lines. For example, if 480 display scanning lines are disposed in the display panel 10, then n is equal to 240, and the display scanning lines of the display panel 10 include the display scanning lines of the first type consisting of the 1st to 240th display scanning lines and the display scanning lines of the second type consisting of the 241th to 480th display scanning lines. The operation process of the display scanning line driving circuit will be illustrated below with the present preferred embodiment as an example, to further describe the process of driving the touch screen.

The set terminal Set of the first amorphous silicon shift register L1 of the first amorphous silicon gate driving circuit ASG1L is connected to a first activating signal STV1L, the set terminal Set of each of the remaining amorphous silicon shift registers (L2, L3, . . . L(n−1)) is connected with the output terminal Out of its preceding amorphous silicon shift register (L1, L2, . . . Ln), the reset terminal Reset of the last amorphous silicon shift register Ln is connected to the first reset signal Reset1L, and the reset terminal Reset of each of remaining amorphous silicon shift registers (L(n−1), . . . L2, L1) is connected with the output terminal Out of its succeeding amorphous silicon shift register (Ln, . . . L3, L2); Similarly, the set terminal Set of the first amorphous silicon shift register L(n+1) of the second amorphous silicon gate driving circuit ASG2L is connected to a second activating signal STV2L, the set terminal Set of each of the remaining amorphous silicon shift registers (L(n+2), L(n+3), . . . L(2n)) is connected with the output terminal Out of its preceding amorphous silicon shift register (L(n+1), L(n+2), . . . L(2n−1)), the reset terminal Reset of the last amorphous silicon shift register L2*n* is connected to the second reset signal Reset2L, and the reset terminal Reset of each of the remaining amorphous silicon shift registers (L(2n−1), . . . L(n+2), L(n+1)) is connected with the output terminal Out of its succeeding amorphous silicon shift register (L(2n), . . . L(n+3), L(n+2)).

As shown in FIG. 6, in the first one of the first time sequences C11, the first activating signal STV1L outputs a signal, then, the signal is sequentially output from each of the amorphous silicon shift registers (L1, L2, L3 . . . Ln) of the first amorphous silicon gate driving circuit ASG1L under the control of a clock signal, and finally, the first reset signal Reset1L outputs the signal, so that the scanning for the display scanning lines of the first type is completed by each of the amorphous silicon shift registers of the first amorphous silicon gate driving circuit ASG1L.

In the first one of the second time sequences C21, neither the first amorphous silicon gate driving circuit ASG1L nor the second amorphous silicon gate driving circuit ASG2L outputs the signal, thus, the first touch scanning is completed for the touch panel.

In the second one of the first time sequences C12, the second activating signal STV2L outputs a signal, then, the signal is sequentially output from each of the amorphous silicon shift registers (L(n+1), L(n+2) ... L2n) of the second amorphous silicon gate driving circuit ASG2L under the control of the first clock signal CKL1 and the second clock signal CKL2, and finally, the second reset signal Reset2L outputs the signal, so that the scanning for the display scanning lines of the second type is completed by each of the amorphous silicon shift registers of the second amorphous silicon gate driving circuit ASG2L.

In the second one of the second time sequences C22, neither the first amorphous silicon gate driving circuit ASG1L nor the second amorphous silicon gate driving circuit ASG2L outputs the signal, thus, the second touch scanning is completed for the touch panel. To this end, one cycle C0 is completed.

Therefore, in one scanning cycle, the display scanning of the display panel is completed once and the touch scanning of the touch panel is completed twice. In this embodiment, each touch scanning may be conducted in a line by line scanning mode, which is well known by those skilled in the art and will not be described again therein.

A Second Embodiment

Figure 7:
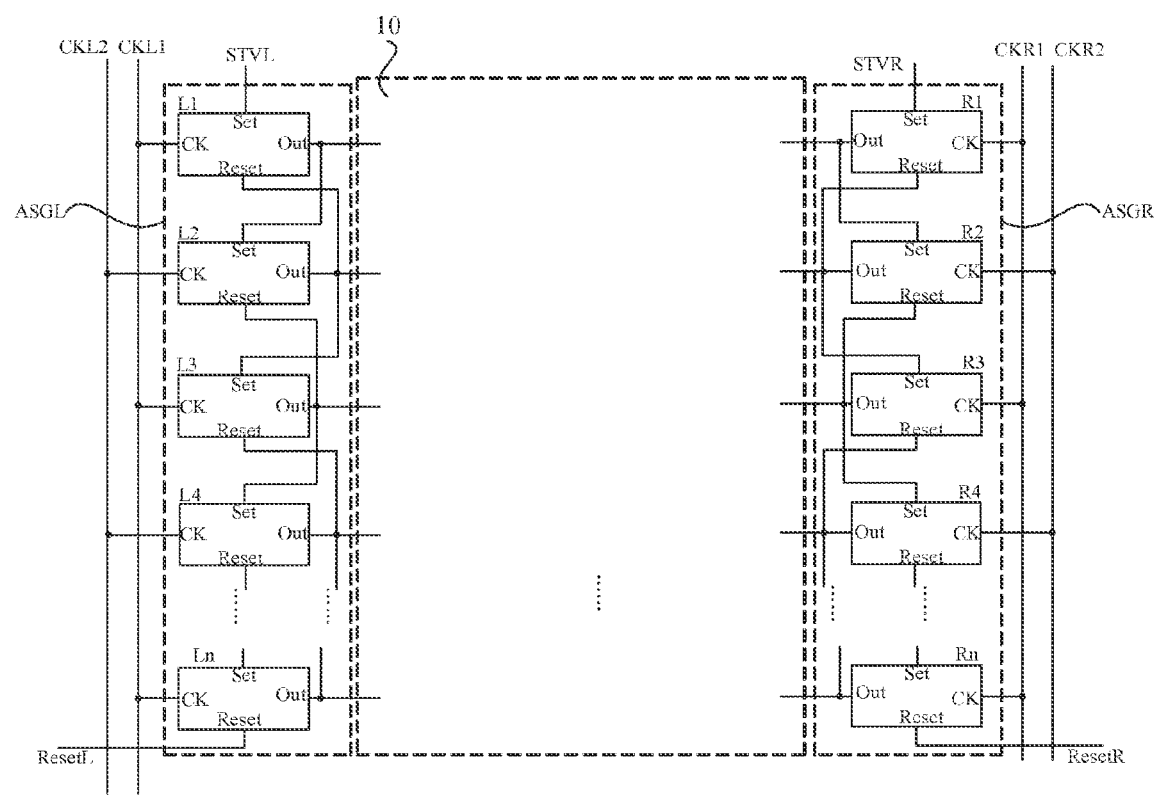
FIG. 7 is schematic diagram showing the structure of a display scanning line driving circuit according to another embodiment of the present invention.
Figure 8:
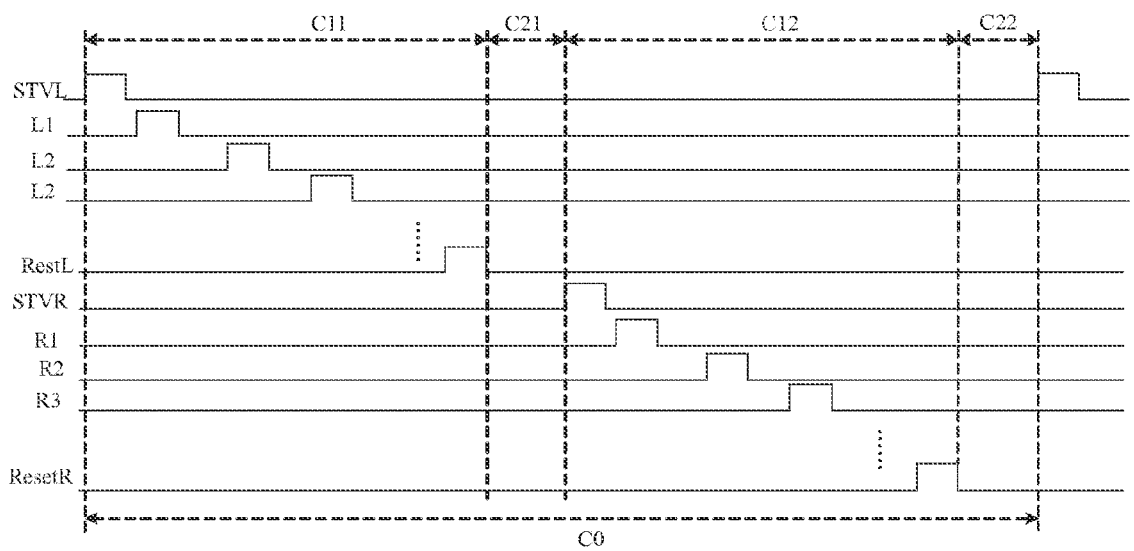
FIG. 8 is a diagram showing operating time sequences of the display scanning line driving circuit according to another embodiment of the present invention.

FIG. 7 is a schematic diagram showing the structure of the display scanning line driving circuit according to an embodiment of the present invention. FIG. 8 is a diagram showing time sequences of the display scanning line driving circuit according to an embodiment of the present invention. In the present embodiment, as shown in FIG. 7, a first amorphous silicon gate driving circuit ASGL and a second amorphous silicon gate driving circuit ASGR are respectively disposed on two sides of the display panel 10. The first amorphous silicon gate driving circuit ASGL and the second amorphous silicon gate driving circuit ASGR are each formed by n sequentially arranged amorphous silicon shift registers, where n is a positive integer and has a value depending on actual process requirements, for example, if 480 display scanning lines are disposed in the display panel 10, then n is equal to 240.

The display scanning lines of the display panel 10 include display scanning lines of the first type and the display scanning lines of the second type, where the display lines of the first type include all of the odd display scanning lines, such as the first display scanning line, the third display scanning line, the fifth display scanning line, and so on; and the display scanning lines of the second type include all of the even display scanning lines, such as the second display scanning line, the fourth display scanning line, sixth display scanning line, and so on. The first amorphous silicon gate driving circuit ASGL corresponds to all of the odd display scanning lines of the display panel 10, and the second amorphous silicon gate driving circuit ASGR corresponds to all of the even display scanning lines of the display panel 10. The set terminal Set of the first amorphous silicon shift register L1 of the first amorphous silicon gate driving circuit ASGL is connected to the first activating signal STVL, and the set terminal Set of each of the remaining amorphous silicon shift registers (L2, L3, ... Ln) is connected with the output terminal Out of its preceding amorphous silicon shift register (L1, L2, ... L(n−1)), the reset terminal Reset of the last amorphous silicon shift register Ln is connected to the first reset signal ResetL, and the reset terminal Reset of each of the remaining amorphous silicon shift registers (L(n−1), ... L2, L1) is connected with the output terminal Out of its succeeding amorphous silicon shift register (Ln, ... L3, L2); Similarly, the set terminal Set of the first amorphous silicon shift register R1 of the second amorphous silicon gate driving circuit ASGR is connected to the second activating signal STVR, the set terminal Set of each of the remaining amorphous silicon shift registers (R2, R3, ... Rn) is connected with the output terminal Out of its preceding amorphous silicon shift register (R1, R2, ... R(n−1)), the reset terminal Reset of the last amorphous silicon shift register Rn is connected to the second reset signal ResetR, and the reset terminal Reset of each of the remaining amorphous silicon shift registers (R(n−1), ... R2, R1) is connected with the output terminal Out of its succeeding amorphous silicon shift register (Rn, ... R3, R2).

The operation process of the display scanning line driving circuit will be illustrated below, to further describe the process of driving the touch screen.

As shown in FIG. 8, in the first one of the first time sequences C11, the first activating signal STVL outputs a signal, then, the signal is sequentially output from each of the amorphous silicon shift registers (L1, L2, ... L3) of the first amorphous silicon gate driving circuit ASGL under the control of clock signals CKL1 and CLK2, and finally, the first reset signal ResetL outputs the signal, so that the scanning for the display scanning lines of the first type is completed by each of the amorphous silicon shift registers of the first amorphous silicon gate driving circuit ASGL.

In the first one of the second time sequences C21, neither the first amorphous silicon gate driving circuit ASGL nor the second amorphous silicon gate driving circuit ASGR outputs the signal, thus, the first touch scanning is completed for the touch panel.

In the second one of the first time sequences C12, the second activating signal STVR outputs a signal, then, the signal is sequentially output from each of the amorphous silicon shift registers (R1, R2, R3 ... ) of the second amorphous silicon gate driving circuit ASGR under the control of the clock signals CKL1 and CKL2, and finally, the second reset signal ResetR outputs the signal, so that the scanning for the display scanning lines of the second type is completed by each of the amorphous silicon shift registers of the second amorphous silicon gate driving circuit ASGR.

In the second one of the second time sequences C22, neither the first amorphous silicon gate driving circuit ASGL nor the second amorphous silicon gate driving circuit ASGR outputs the signal, thus, the second touch scanning is completed for the touch panel. To this end, one cycle C0 is completed.

Therefore, in one scanning cycle, the display scanning of the display panel is completed once and the touch scanning of the touch panel is completed twice. Each touch scanning may be conducted in a line by line scanning mode, which is well known by those skilled in the art and will not be described again therein.

A Third Embodiment

Figure 9:
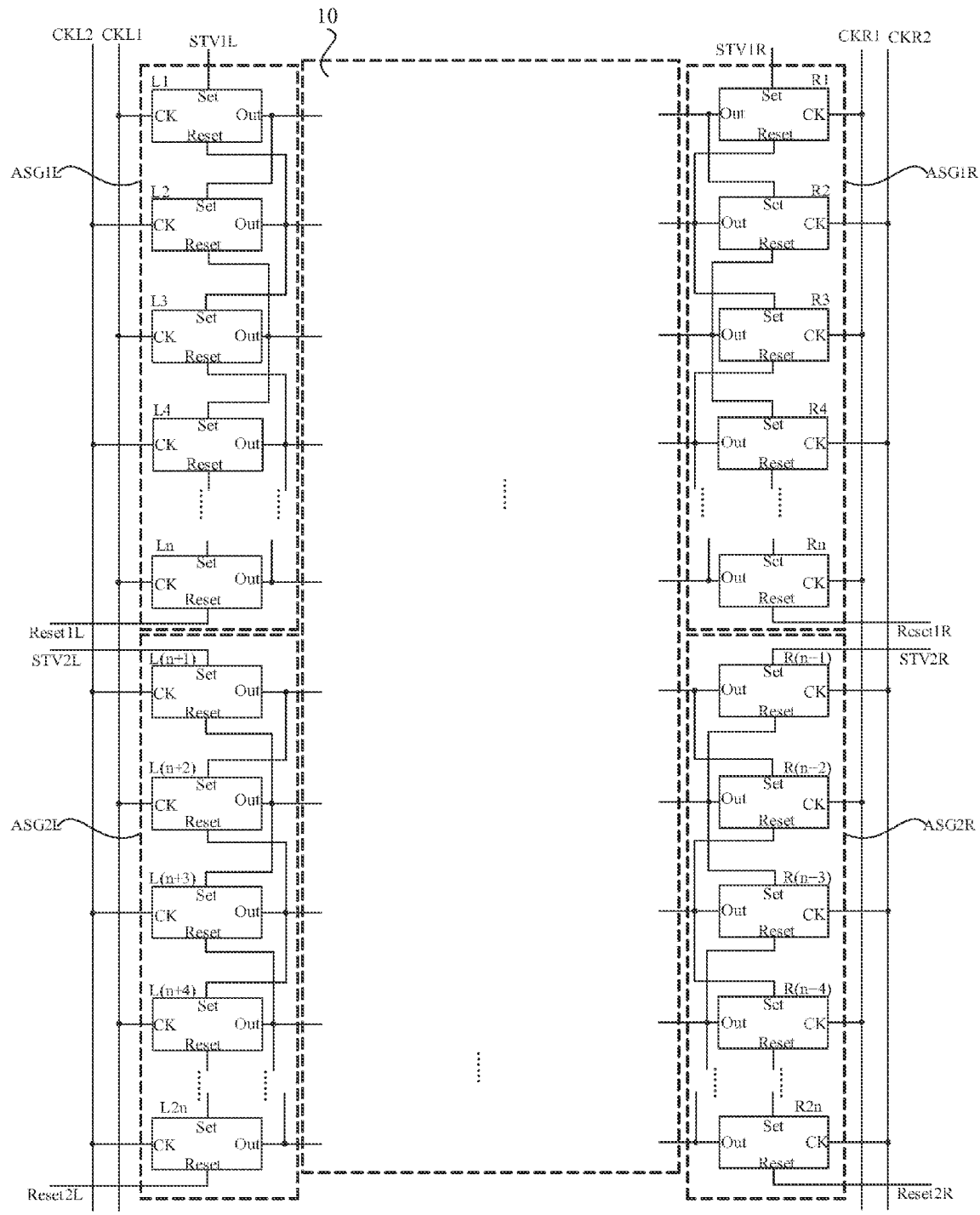
FIG. 9 is schematic diagram showing the structure of the display scanning line driving circuit according to yet another embodiment of the present invention.
Figure 10:
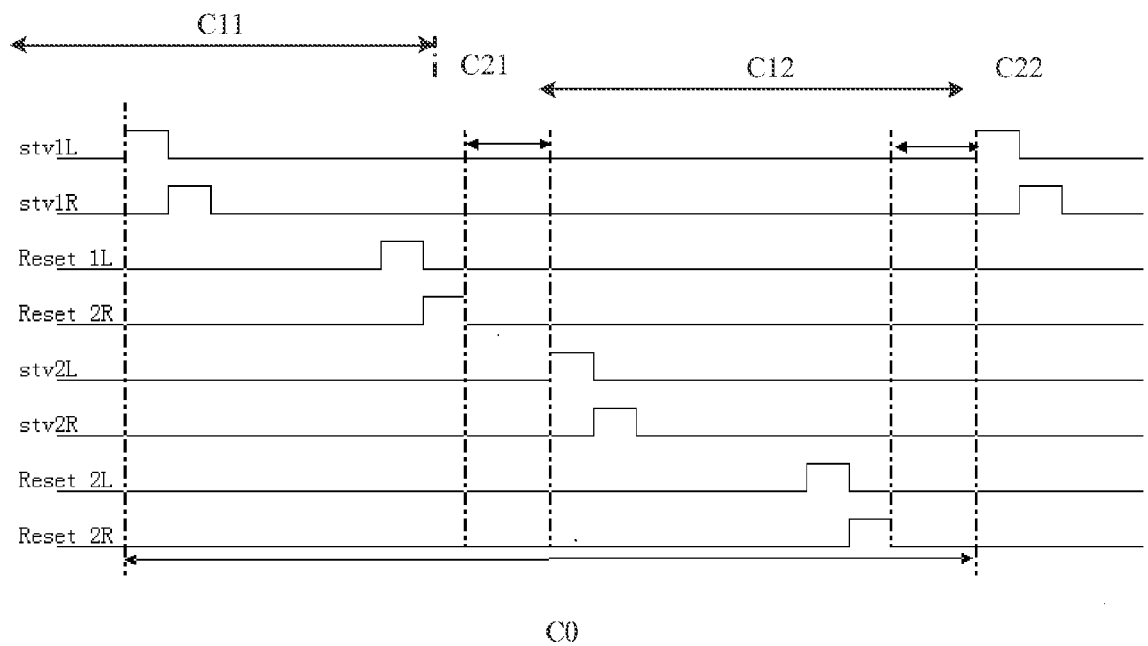
FIG. 10 is a diagram showing operating time sequences of the display scanning line driving circuit according to yet another embodiment of the present invention.

FIG. 9 is a schematic diagram showing the structure of the scanning line driving circuit according to another embodiment of the present invention. FIG. 10 is a diagram showing time sequences of the display scanning line driving circuit according to this another embodiment of the present invention. As shown in FIG. 9, a first amorphous silicon gate driving circuit ASG1L, a second amorphous silicon gate driving circuit ASG1R, a third amorphous silicon gate driving circuit ASG2L, and a fourth amorphous silicon gate driving circuit ASG2R are disposed on both sides of the display panel 10.

The display scanning lines of the display panel 10 include display scanning lines of the first type and display scanning lines of the second type, where the display scanning lines of the first type are arranged alternately with the display scanning lines of the second type.

The first amorphous silicon gate driving circuit ASG1L scans the display scanning lines of the first type in the former part of the display scanning lines in the first one of the first time sequences, the second amorphous silicon gate driving circuit ASG1R scans the display scanning lines of the second type in the former part of the display scanning lines in the second one of the first time sequences, the third amorphous silicon gate driving circuit ASG2L scans the display scanning lines of the first type in the latter part of the display scanning lines in the first one of the first time sequences, and the fourth amorphous silicon gate driving circuit ASG2R scans the display scanning lines of the second type in the latter part of the display scanning lines in the second one of the first time sequences. In this case, the ratio of the time duration of the first one of the first time sequences to the time duration of the second one of the first time sequences corresponds to the ratio of the number of the former part of the display scanning lines to the number of the latter part of the display scanning lines. Specifically, if the number of the display scanning lines is defined as K, the former part of the display scanning lines consist of the 1st to the Lth display scanning lines, and the latter part of the display scanning lines consist of the (L+1)th to the Kth display scanning lines, where K is a positive integer, and L is a positive integer less than K.

In a preferred embodiment, the number of the display scanning lines is defined as 4n, where n is a positive integer. The former part of the display scanning lines consist of 2n display scanning lines, where the display scanning lines of the first type in the former part of the display scanning lines consist of n display scanning lines and the display scanning lines of the second type in the former part of the display scanning lines consist of n display scanning lines; the latter part of the display scanning lines consist of 2n display scanning lines, where the display scanning lines of the first type in the latter part of the display scanning lines consist of n display scanning lines and the display scanning lines of the second type in the latter part of display scanning lines consist of n display scanning lines. Each amorphous silicon gate driving circuit contains n amorphous shift registers, and corresponds to n display scanning lines of the display panel. The operation process of the display scanning line driving circuit will be illustrated below with the present preferred embodiment as example, to further illustrate the process of driving the touch screen.

Each of the amorphous silicon shift registers (L1, L2 . . . Ln) of the first amorphous silicon gate driving circuit ASG1L is connected with the respective one of the former half of the odd display scanning lines of the display panel 10, e.g. the first display scanning line, the third display scanning line, the fifth display scanning line the (2n−1)th display scanning line; and each of the amorphous silicon shift registers (R1, R2 . . . Rn) of the second amorphous silicon gate driving circuit ASG1R is connected with the respective one of the former half of the even display scanning lines of the display panel 10, e.g. the second display scanning line, the fourth display scanning line, the sixth display scanning line the (2n)th display scanning line; each of the amorphous silicon shift registers (L(n+1), L(n+1) . . . L2n) of the third amorphous silicon gate driving circuit ASG2L is connected with the respective one of the latter half of the odd display scanning lines of the display panel 10, e.g. the (2n+1)th display scanning line, the (2n+3)th display scanning line, the (2n+5)th display scanning line the (4n−1)th display scanning line; and each of the amorphous silicon shift registers (R(n+1), R(n+2) . . . R2n) of the fourth amorphous silicon gate driving circuit ASG2R is connected with the respective one of the latter half of the even display scanning lines of the display panel 10, e.g. the (2n+2)th display scanning line, the (2n+4)th display scanning line, the (2n+6)th display scanning line the 4 nth display scanning line.

The set terminal Set of the first amorphous silicon shift register L1 of the first amorphous silicon gate driving circuit ASG1L is connected to the first activating signal STV1L, the set terminal Set of each of the remaining amorphous silicon shift registers (L2, L3, . . . Ln) is connected with the output terminal Out of its preceding amorphous silicon shift register (L1, L2, . . . L(n−1)), the reset terminal Reset of the last amorphous silicon shift register Ln is connected to the first reset signal Reset1L, and the reset terminal Set of each of the remaining amorphous silicon shift registers (L(n−1), . . . L2, L1) is connected with the output terminal Out of its succeeding amorphous silicon shift register (Ln, . . . L3, L2).

The set terminal Set of the first amorphous silicon shift register R1 of the second amorphous silicon gate driving circuit ASG1R is connected to the second activating signal STV1R, and the set terminal Set of each of the remaining amorphous silicon shift registers (R2, R3, . . . Rn) is connected with the output terminal Out of its preceding amorphous silicon shift register (R1, R2, . . . R(n−1)); the reset terminal Reset of the last amorphous silicon shift register Rn is connected to the second reset signal Reset1R, and the reset terminal Reset of each of the remaining amorphous silicon shift registers (R(n−1), . . . R2, R1) is connected with the output terminal ("Out") of its succeeding amorphous silicon shift register (Rn, . . . R3, R2).

The set terminal Set of the first amorphous silicon shift register L(n+1) of the third amorphous silicon gate driving circuit ASG2L is connected to a third activating signal STV2L, and the set terminal Set of each of the remaining amorphous silicon shift registers (L(n+2), L(n+3), . . . L(2n)) is connected with the output terminal Out of its preceding amorphous silicon shift register (L(n+1), L(n+2), . . . L(2n−1)); the reset terminal Reset of the last amorphous silicon shift register L2n is connected to the third reset signal Reset2L, and the reset terminal Reset of each of the remaining amorphous silicon shift registers (L(2n−1), . . . L(n+2), L(n+1)) is connected with the output terminal Out of its succeeding amorphous silicon shift register (L(2n), . . . L(n+3), L(n+2)).

The set terminal Set of the first amorphous silicon shift register R(n+1) of the fourth amorphous silicon gate driving circuit ASG2R is connected to a fourth activating signal STV2R, and the set terminal Set of each of the remaining amorphous silicon shift registers (R(n+2), R(n+3), . . . R(2n)) is connected with the output terminal Out of its preceding amorphous silicon shift register (R(n+1), R(n+2) . . . R(2n−1)); the reset terminal Reset of the last amorphous silicon shift register R2n is connected to a fourth reset signal Reset2R, and the reset terminal Reset of each of the remaining amorphous silicon shift registers (R(2n−1), R(n+2), R(n+1)) is connected with the output terminal Out of its succeeding amorphous silicon shift register (R(2n), R(n+3), R(n+2)).

As shown in FIG. 10, in the first one of the first time sequences C11, the first activating signal STV1L outputs a signal, then, a signal is sequentially output from each of the amorphous silicon shift registers (L1, L2, L3 . . . Ln) of the first amorphous silicon gate driving circuit ASG1L under the control of the clock signals CKL1 and CLK2, which will be not described again herein since the outputting manner of the amorphous silicon shift register is the same with that of the amorphous silicon shift register of the first amorphous silicon gate driving circuit in the first embodiments; after the first activating signal STV1L ends, the second activating signal STV1R is output immediately, a signal is sequentially output from each of the amorphous silicon shift registers (R1, R2, R3 . . . Rn) of the second amorphous silicon gate driving circuit ASG1R under the control of the clock signals CKR1 and CKR2, which will also be not described again herein since the outputting manner of the amorphous silicon shift register is the same with that of the amorphous silicon shift register of the second amorphous silicon gate driving circuit in the first embodiments; and finally, the first reset signal Reset1L outputs a signal, so that the scanning for the display scanning lines of the first type in the former half of the display scanning lines is completed by each of the amorphous silicon shift registers of the first amorphous silicon gate driving circuit ASG1L, and then the second reset signal Reset1R outputs a signal, so that the scanning for the display scanning lines of the second type in the former half of the display scanning lines is completed by each of the amorphous silicon shift registers of the second amorphous silicon gate driving circuit ASG1R.

In the first one of the second time sequences C21, no signal is output from the first amorphous silicon gate driving circuit ASG1L, the second amorphous silicon gate driving circuit ASG1R, the third amorphous silicon gate driving circuit ASG2L, and the fourth amorphous silicon gate driving circuit ASG2R, thus, one touch scanning is completed for the touch panel;

In the second one of the first time sequences C12, the third activating signal STV2L outputs a signal, then, the signal is sequentially output from each of the amorphous silicon shift registers (L(n+1), L(n+2) . . . L2n) of the third amorphous silicon gate driving circuit ASG2L under the control of the clock signals CKL1 and CKL2. After the third activating signal STV2L ends, the fourth activating signal STV2R is output, then, the signal is sequentially output from each of the amorphous silicon shift registers (R(n+1), R(n+2) . . . R2n) of the fourth amorphous silicon gate driving circuit ASG2R under the control of the clock signals CKR1 and CKR2, and then, the third reset signal Reset2L outputs the signal, so that the scanning for the display scanning lines of the first type in the latter half of the display scanning lines is completed by each of the amorphous silicon shift registers of the third amorphous silicon gate driving circuit ASG2L, and then the fourth reset signal Reset2R outputs the signal, so that the scanning for the display scanning lines of the second type in the latter half of the display scanning lines is completed by each of the amorphous silicon shift registers of the fourth amorphous silicon gate driving circuit ASG2R. Each touch scanning is conducted in a line by line scanning mode, which is well known by those skilled in the art and will not be described again therein.

It should be noted that the structure of the display scanning line driving circuit provided by the present invention is not limited to those of above-described embodiments, and other structures, in which the scanning of the display panel is completed once and the scanning of the touch panel is completed at least twice within one cycle, fall into the scope of the concept of the present invention. Meanwhile, the amorphous silicon shift registers of each amorphous silicon gate driving circuit in the display scanning line driving circuit are not limited to be controlled by two clock signals, instead can also be controlled by four clock signals, six clock signals, etc., for outputting. Correspondingly, connection relationships of the output terminal, the set terminal and the reset terminal of each amorphous silicon shift register in each amorphous silicon gate driving circuit are not limited to those described in the above-described embodiments, and other structures of the amorphous silicon gate driving circuit, which are suitable for implementing a shift register function and sequentially outputting signals, should fall into the scope of the concept of the present invention. Furthermore, the scanning mode for the touch panel and the circuit structure of the touch panel are not limited in the driving method for the touch screen according to the present invention, that is, the above driving method for the touch screen is widely suitable for various structures of the touch screen, requires for merely little structural change in the display circuit and the control circuit, and thus is easy to be implemented.

With the driving method for the touch screen according to the present invention, at least two first time sequences and at least two second time sequences are arranged within one cycle, where different display scanning lines of the display panel are scanned in different first time sequences, and the scanning for all of the display scanning lines of the display panel is completed in all of the first time sequences of one cycle; and a plurality of scanning signals are generated and sequentially delivered to all of the touch scanning lines of the touch panel in each of the second time sequences, so that the display scanning of the display panel is completed once and the touch scanning of the touch panel is completed at least twice within one cycle.

Briefly, with the driving method for the touch screen according to the present invention, the frequency of the touch scanning can be greatly increased without increasing the frequency of the display scanning, so that not only sufficient scanning time is ensured for the display panel to enable the clear display, but also the frequency of the touch scanning is increased, and the noise interference is reduced, thereby improving the detection accuracy and the response speed of the touch panel.

The disclosed embodiments of the present invention described above are not intended to limit the present invention. Modifications, equivalent substitutions, improvements, etc., can be made by those skilled in the art without departing from the spirit and principle of the present invention.

What is claimed is:

1. A driving method for a touch screen including a display panel, a touch panel, and a control circuit, the method comprising:
    sequentially sending display scan signals to even-numbered display scanning lines of a plurality of display scanning lines on the display panel during a continuous first display time sequence;
    sequentially sending touch scan signals to each of a plurality of touch scanning lines on the touch panel during a continuous first touch time sequence;
    sequentially sending display scan signals to odd-numbered display scanning lines of the plurality of display scanning lines on the display panel during a continuous second display time sequence; and
    sequentially sending touch scan signals to all of the plurality of touch scanning lines on the touch panel during a continuous second touch time sequence;
    wherein one frame of image is displayed in a cycle of a periodic scanning control signal, wherein the cycle of the periodic scanning control signal consists of the first display time sequence, the first touch time sequence, the second display time sequence and the second touch time sequence arranged in this order.

2. The driving method of claim 1, wherein a time duration of the first display time sequence is equal to a time duration of the second display time sequence, and a time duration of the first touch time sequence is equal to a time duration of the second touch time sequence.

3. The driving method of claim 1, wherein the touch screen further includes a display scanning line driving circuit, the display scanning line driving circuit includes a first amorphous silicon gate driving circuit comprising a plurality of amorphous silicon shift register circuits, each associated with one of the display scanning lines; and wherein an output terminal of each of the amorphous silicon shift register circuits is electrically connected with the associated display scanning line.

4. The driving method of claim 3, the display scanning line driving circuit further comprising a first and a second amorphous silicon gate driving circuits located together on a side of the display panel.

5. The driving method of claim 4, wherein the first amorphous silicon gate driving circuit corresponds to the display scanning lines from the first to the Lth, and the second amorphous silicon gate driving circuit corresponds to the display scanning lines from the (L+1)th to the Kth, wherein K is the number of the plurality of display scanning lines, K is a positive integer, and L is a positive integer less than K.

6. The driving method of claim 5, wherein K is equal to 2n, and L is equal to n, n is a positive integer.

7. The driving method of claim 3, wherein the display scanning line driving circuit further includes a second amorphous silicon gate driving circuit the first and second amorphous silicon gate driving circuits respectively located on two sides of the display panel.

8. The driving method of claim 7, wherein the plurality of display scanning lines are divided into a first group and a second group, wherein the plurality of amorphous silicon shift register circuits of the first amorphous silicon gate driving circuit respectively correspond to the display scanning lines of the first group, and the amorphous silicon shift register circuits of the second amorphous silicon gate driving circuit respectively correspond to the display scanning lines of the second group, wherein the display scanning lines of the first group are arranged alternately with the display scanning lines of the second group.

9. The driving method of claim 3, the display scanning line driving circuit further including first, second, third, and fourth amorphous silicon gate driving circuits, wherein the first amorphous silicon gate driving circuit and the third amorphous silicon gate driving circuit are located on one side of the display panel, and the second amorphous silicon gate driving circuit and the fourth amorphous silicon gate driving circuit are located on the other side of the display panel.

10. The driving method of claim 1, wherein a frequency of the periodic scanning signal is in a range from 50 Hz to 70 Hz.

11. The driving method of claim 10, wherein the periodic scanning signal further comprises a frequency of 60 Hz.

12. The driving method of claim 11, wherein each cycle further includes two first time sequences and two second time sequences, and a time duration of each of the second time sequences is in a range from 1 ms to 2 ms.

* * * * *